Patented Dec. 21, 1943

2,337,190

UNITED STATES PATENT OFFICE 2,337,190

CYCLIZATION OF HYDROCARBONS

Bernard S. Greensfelder, Berkeley, and Raymond C. Archibald, Contra Costa County, Calif., assignors to Shell Development Company, San Francisco, Calif., a corporation of Delaware No Drawing. Application May 17, 1941,
Serial No. 394,000

14 Claims. (Cl. 260—673.5)

The present invention relates to the catalytic cyclization of open chain hydrocarbons into closed chain or cyclic hydrocarbons. More particularly, the invention relates to an improved process involving the use of special catalysts whereby open chain hydrocarbons may be efficiently converted into aromatic hydrocarbons.

It has been found by Moldavskii and co-workers that aromatic hydrocarbons may be synthesized by the catalytic cyclization-dehydrogenation of open chain hydrocarbons. This new reaction holds considerable promise in that it allows aromatic hydrocarbons to be produced from inexpensive and readily available hydrocarbons and particularly the normal aliphatic hydrocarbons which, in view of their poor ignition characteristics, are least desirable for gasoline-type fuels. A further advantage which can be gained by the utilization of catalytic cyclization is that, if naphthenic hydrocarbons are present in the hydrocarbon fraction treated, there may be simultaneously dehydrogenated to aromatic hydrocarbons, thus increasing the yield. In view of the great possibilities afforded by the cyclization reaction, a great deal of work has been done to bring this reaction into the realm of practical application.

The production of aromatic hydrocarbons by cyclization requires catalysts having dehydrogenating activity. It is known, however, that the cyclization ability of a given catalyst involves more than simply its dehydrogenating ability. Although nearly all classes of dehydrogenating catalysts have been investigated with regard to their possible cyclization activities, only a relatively few have been found to exert an appreciable cyclization activity. The most active cyclization catalysts are found among the compounds of metals of the left-hand columns of groups IV, V and VI of the periodic table. Of these, those of group VI and especially chromium are by far the most active.

The cyclization ability of the various catalytic metal compounds is, in general, relatively little affected by the type of compound in which the metal is combined. Thus, for example, the oxides, sulfides, halides, selenides, tellurides, phosphates, manganates, molybdates, chromates, chromites, tungstates, etc. or mixtures thereof may generally be employed. Generally speaking, however, the various cyclizing metals are preferably used in the form of their oxides.

These cyclizing metal compounds per se are, however, not generally suited for practical application due to the fact that they quickly lose their cyclizing activity in use. In order to produce aromatic hydrocarbons in a more economical manner, special combination catalysts having greater stability are invariably employed. Thus, the cyclizing metal compounds are usually supported upon suitable carrier materials. Although most of the large variety of common catalyst carriers may be employed, a very beneficial stabilizing effect is obtained with carriers having appreciable adsorptive properties. Thus, for example, it is generally preferable to employ one of the so-called "activated" carriers such as activated carbon, activated coal, activated magnesia, activated clays, silica gel and the like. Especially suitable carriers are those comprising activated or adsorptive aluminas such, for instance, as the various activated alumina gels, activated bauxite and the like. A particularly effective adsorptive alumina is that prepared according to the process of U. S. Patent 1,868,869, and commonly used in the trade under the name "Activated Alumina."

The cyclizing metal compound and relatively inactive stabilizing compound may be employed in a wide range of proportions. In general, however, the stabilizing material functions also as a carrier material and is used in excess. Suitable catalysts may comprise, for example, an adsorptive and stabilizing carrier material supporting from 2% to 30% of a catalytically active metal in the form of a suitable compound such as an oxide, sulfide, or the like.

These supported catalysts may be prepared in any one of several conventional manners. A convenient method comprises impregnating a suitable carrier in the form of granules or pellets of the desired size with a solution of a compound of the metal which it is desired to combine with the carrier, and then drying. The concentration of the impregnating solution used in this particular case will depend upon the solubility of the particular metal compound at the temperature of the impregnation and upon the desired concentration of the metal compound in the compound catalyst. The procedure followed in drying or treating the impregnating material will vary depending upon the chemical constitution of the compound catalyst. In general, the material can be dried in air at temperatures as high as 800° C. or even higher in some cases. In other cases, it may be desirable to effect the drying with inert gases such as nitrogen, or reducing gases such as hydrogen, hydrocarbons, etc.

Many of the compounds which are desired as active cyclizing constituents of the combined catalyst, such as the oxides and sulfides, are not sufficiently water-soluble to permit direct impregnation of the carrier with their aqueous solutions. In such cases, the stabilizing carrier may be impregnated with a solution of a salt which can be converted to the desired metal oxide, metal sulfide or the like by calcination, hydrogen sulfide treatment, or the like, of the impregnated material. A cyclizing metal oxide-containing catalyst may also be obtained by precipitating a corresponding metal hydroxide on the surface of the carrier and subjecting the thus-obtained material to calcination under suitable temperature conditions.

The catalysts prepared as described are often submitted to a pretreatment prior to their use. Thus, for example, they are often heated for some hours at temperatures between about 300° C. and 600° C. in the presence of gases such as hydrogen, hydrogen sulfide, hydrogen plus natural gas, etc. Such pretreatment usually improves their activity somewhat.

The process of cyclization-dehydrogenation to produce aromatic hydrocarbons using cyclizing metal compound catalysts is especially suitable for the production of aromatic hydrocarbons and relatively simple mixtures of aromatic hydrocarbons from individual hydrocarbons having preferably not more than twelve carbon atoms in an open chain and capable of being cyclized to six-membered rings and/or hydrocarbon mixtures containing one or more of such hydrocarbons in appreciable quantities. Thus, it is applicable to the economic production of mono-nuclear aromatic hydrocarbons from hydrocarbons containing at least six and preferably not more than twelve carbon atoms in an open chain. For example, the predominant aromatic hydrocarbons found in the product when treating a few of such open chain hydrocarbons are shown in the following table:

*Table I*

| Open chain hydrocarbon employed | Predominant aromatic hydrocarbons found in the reaction product |
|---|---|
| N-hexane | Benzene. |
| N-heptane | Toluene. |
| 2-methyl hexane | Do. |
| N-octane | Ortho xylene. |
| 2,5-dimethyl hexane | Para xylene. |
| N-nonane | Ortho methyl ethyl benzene. |
| N-decane | Ortho methyl propyl benzene. |
| Hexene-1 | Benzene. |
| Hexene-2 | Do. |
| N-octene | Ortho xylene. |

The process is also applicable for the cyclization of alkylated cyclic hydrocarbons, such as n-butyl benzene, n-amyl benzene, n-butyl cyclohexane, n-butyl cyclopentene, crotyl benzene, and the like. These compounds, although they contain cyclic substituents, also contain open chains which may be cyclized to produce poly-nuclear hydrocarbons. In the cyclization of hydrocarbons of these types two carbon atoms of the cyclic substituent adjacent to the alkyl group may function, in effect, as belonging to the alkyl chain. Of the various applicable hydrocarbons, somewhat better results are, in general, obtained with normal and slightly branched hydrocarbons. Applicable hydrocarbon mixtures may also contain higher and/or lower boiling cyclizable and non-cyclizable hydrocarbons such as naphthenic hydrocarbons, paraffinic hydrocarbons, olefinic hydrocarbons, and the like. Thus, for example, normal heptane may be cyclized in the presence of methane, ethane, ethylene, benzene, toluene, octane, 2-methyl pentane, and the like, and excellent yields of toluene obtained. We have found, however, that materially improved catalyst life and therefore operating economy can be realized when treating hydrocarbon mixtures containing lower boiling non-aromatizable hydrocarbons, if such mixtures are first treated to remove butanes and pentanes. Isopentane, when present in substantial concentrations in the hydrocarbon mixture, is particularly detrimental and is preferably removed.

The process is also suitable for the conversion of paraffinic and olefinic hydrocarbons in light petroleum fractions, such as gasoline, etc., into aromatic hydrocarbons. By treating such petroleum fractions, their aromatic content is considerably increased (any hydro-aromatic hydrocarbons which may be present are also dehydrogenated to aromatic hydrocarbons), very little cracking occurs and a stable product of low olefine content and increased anti-knock properties is obtained. The hydrocarbon treated is preferably substantially free of water and/or compounds, such as the alcohols which form water under the reaction conditions.

The hydrocarbon or hydrocarbon mixture to be treated is preferably passed as a vapor in contact with the catalyst in a suitable converter maintained at the desired temperature. The catalyst may be either in a fixed bed or it may be passed through the reaction zone as a moving bed or as a finely divided powder. While pressures both below and above atmospheric pressure (for instance, 0.01 to 50 atm.) are applicable, the process is usually executed in practice at atmospheric pressures or thereabouts, for instance, 1 to 10 atm.

In order to produce the best yields of aromatic hydrocarbons and realize the maximum efficiency of the catalyst, the cyclization is usually effected at a temperature between about 350° C. and 700° C. Temperatures lower than about 400° C. are, in general, less desirable since they require low space velocities and give low conversions. Temperatures above about 600° C. allow much higher space velocities and high conversions but are, in general, less desirable since they usually lead to cracking and carbon deposition.

The contact time required to effect the formation of aromatic hydrocarbons by catalytic cyclization-dehydrogenation of open chain hydrocarbons is usually considerably longer than that required for some of the simple types of dehydrogenation and usually is at least five seconds. Suitable contact times for operation in the above temperature range are, for instance, between about six seconds and two minutes. When operating within a preferred temperature range of about 450° C. to 550° C., optimum results are usually obtained with contact times between about six and eighty seconds.

The catalytic reaction is often executed in the presence of added hydrogen. The ratio of hydrogen to hydrocarbon may range, for example, from 0 up to about 5 mols per mol. The presence of hydrogen, it is found, tends to prolong the life of the catalyst by inhibiting side reactions which lead to tar and carbon formation. The use of added hydrogen is consequently of most advantage when treating complex hydrocarbon mixtures such as cracked gasoline stocks, etc., which ordinarily tend to tar and coke the catalyst relatively quickly. The cyclization reaction is, however, inhibited by excessive hydrogen pressures. When hydrogen is used, its partial pressure is therefore preferably kept below about 15 atmospheres.

The above-described catalytic cyclization process in its more preferred embodiments and under favorable conditions is a fairly attractive process, even though the conversions obtained are far from those theoretically possible. The most favorable results so far obtained by this process have been with the use of a catalyst consisting essentially of chromium oxide incorporated in the surface of an active gamma alumina. Typical results obtainable with such a catalyst under a chosen set of favorable conditions are illustrated in the following example:

*Example I*

The catalyst is prepared by impregnating pellets of an adsorptive gamma alumina with pure chromic acid, drying relatively quickly at about 110° C. Prior to use, the catalyst is heated at about 500° C. for about one hour in a stream of hydrogen to reduce the chromic acid to a lower oxide (probably $Cr_2O_3$).

This catalyst is supported in a suitable reaction tube and maintained at an even temperature of about 490° C. while vapors of pure normal heptane are passed therethrough at a pressure of approximately one atmosphere and a space velocity of about 0.33 volume of liquid per volume of catalyst per hour.

The initial conversion to toluol and the conversions after various periods of continuous use are approximately as follows:

| Time in hours | Conversions |
| --- | --- |
|  | Per cent |
| Initial | 88 |
| 1 hour | 70 |
| 5 hours | 48 |
| 10 hours | 37 |
| 15 hours | 25 |

The catalyst may at any time be restored to approximately its initial activity by carefully burning off small amounts of combustible deposits according to conventional practice and this may be repeated several hundred times before the catalyst declines in activity to such an extent that it is necessary to replace it.

The present invention constitutes an improvement in the above-described catalytic cyclization process. The object of the invention is to provide an improved method whereby aromatic hydrocarbons may be produced from open chain hydrocarbons in a more advantageous manner, more particularly by providing a method affording better and more sustained conversions. This object is realized according to the process of the invention by effecting the cyclization process with cyclization catalysts specifically promoted by minor amounts of a combination of two distinct types of substances to more selectively and efficiently catalyze ring closure.

The aromatization of open chain hydrocarbons is a quite complicated reaction, the mechanism of which is as yet not completely understood. At present there are no rules evolved which would allow one to predict which materials will catalyze this reaction and which will not, except, as pointed out above, that it is observed that all cyclization catalysts also possess a certain dehydrogenating ability. Thus, the considerable number of known compounds having cyclizing ability have been found quite empirically by investigation of the very large number of known dehydrogenating catalysts. It frequently happens that catalysts may be specifically promoted in certain characteristics by the addition of small amounts of certain so-called promoter substances which may or may not in themselves exert a catalytic action. The finding of such promoter substances, when they exist, is, however, on an even more empirical basis than the finding of suitable catalytic agents. There is practically no way of predicting the effect of promoter substances. Furthermore, in order to produce a promoting effect, the promoter or promoters usually must be employed within certain very narrow ranges of concentrations and there is no way, except by actual study of a range of concentrations, of determining whether a suitable promoting effect is possible. In the field of hydrocarbon cyclization little is known of the possibilities of promotion. Aside from a general promotion of most cyclization catalysts by certain forms of alumina and a doubtful slight promoting effect of small amounts of molybdena or chromia in combination with other elements as the principal catalytic agents, as far as we are aware no promoters specific to cyclization are generally known. We have now found that the cyclizing ability of cyclization catalysts may be promoted by the incorporation in cyclization catalysts of suitable concentrations of a compound of a rare earth element in conjunction with suitable concentrations of compounds of certain alkali metals.

The rare earth elements, it is known, comprise the separate and distinct group of elements having atomic numbers between 57 and 72, i. e., comprising the elements between lanthanum and hafnium in the periodic system. Of the various available rare earth elements, one that is preferred, especially in view of its great availability, is the second member of the series, namely cerium. Other elements of the group, however, including lanthanum, praseodymium and neodymium have been used and found to be suitable. The rare earth compound does not need to be pure but may be a compound of a mixture of rare earth elements. Thus, instead of employing a pure cerium compound, the catalyst may be promoted with a compound of a crude rare earth mixture. Such mixtures of rare earth compounds are obtained in processes for recovering rare earths from monazite sand, samarskite and other minerals and are readily obtainable at reasonable cost. The rare earth or mixture of rare earths is probably present in the catalyst in the form of an oxide. In preparing the catalyst, however, other compounds capable of being converted to an oxide upon subsequent treatment may be employed. Preferred compounds are the oxygenated compounds such as the nitrates, acetates, oxalates and the like. The rare earth compound may moreover contain the rare earth in either the lower or higher valence state since they both revert to a common state of oxidation under the conditions of use.

The cerium or other rare earth is employed in the catalyst in a concentration preferably between about 2.5% and 20% of the metal in the active cyclizing component. Thus, for instance, a chrome-alumina catalyst comprising 10% chromium as chromium oxide is preferably impregnated with such an amount of cerium or other rare earth nitrate or other compound that the concentration of cerium or other rare earth is between about 0.25% and 2% based on the total catalyst. The rare-earth elements, such as cerium, when incorporated in cyclization catalysts comprising an active cyclizing agent on a suitable support produce a small but definite increase in conversion. When the support contains appreciable amounts of alumina alpha monohydrate or other material that, in the absence of the promoter, gives rise to an induction period, an additional effect of the promoter in reducing or eliminating the induction period is observed. When the rare-earth promoter is employed in conjunction with a suitable alkali metal compound on a combination of active cyclizing agent and carrier, the combined promoters produce a great increase in the ring-closing ability of the catalyst. When used in conjunction with the alkali-metal promoter, the rare-earth promoter no longer has the ability to eliminate any induction period that might exist, but produces an over-all increase in conversion.

Of the various available alkali metal compounds which in conjunction with a rare earth promoter produce the desired promoting effect, those of potassium are preferred. Rubidium and caesium compounds are equally, if not more, effective but in view of their relatively high cost are of less technical importance. Sodium compounds are more or less inert but may exert a weak promoting effect or a weak depressing effect, depending upon their concentrations. When present with the optimum concentrations of a heavier alkali metal, however, concentrations of sodium up to about 15% by weight of the metal in the active cyclizing compound may exert an additional promoting effect. Lithium compounds, we have found, when used in conjunction with the rare earth promoter, exert a decided depressing effect. Thus, it is seen that the alkali metal compounds when used in conjunction with the rare earth promoter fall into a definite series in the order of their atomic weights; lithium acts as a depressor; sodium acts either as a very weak depressor or a very weak promoter as a substitute for potassium but exerts some additional promoting effect when present with potassium; potassium acts as a strong promoter; rubidium and caesium are even stronger promoters.

The alkali metal promoter may be applied to the catalyst in the form of the oxide, hydroxide, nitrate, nitrite, carbonate, acetate, cyanide or the like. Of these the nitrate is preferred.

The alkali metal promoter required in conjunction with the above-specified concentrations of rare earth promoter to produce the desired promoting effect depends upon the amount of cyclizing metal compound in the catalyst and is quite critical. The alkali metal compound is employed in an amount affording a concentration of alkali metal between about 6% and 30% and more preferably between about 6% and 20% of the metal in the active cyclizing catalyst. Thus, for instance, in a catalyst comprising chromium oxide (10% Cr) incorporated in the surface of an alumina support, a compound of potassium such as the hydroxide, carbonate, nitrate or the like is incorporated to give a potassium content of between about 0.6% and 3% and more preferably between about 0.6% and 2% based on the total catalyst. If the concentration is either below or above this range of concentrations the alkali metal acts as a depressor rather than a promoter.

While the above described promoter substances when employed in the specified concentrations may be advantageously applied with a wide variety of cyclization catalysts, their effect is most pronounced in cyclization catalysts comprising a compound and preferably an oxide of a heavy metal of the first transition series, namely, Ti, V, Cr, Mn, Fe, Co and Ni. Chromium oxide catalysts which, as explained above, constitute the most active of the hitherto known cyclization catalysts are especially susceptible to promotion by this combination of promoters. As pointed out above, this promoter combination may be advantageously employed with cyclization catalysts prepared from various carrier materials including carriers comprising substantial amounts of alumina alpha monohydrate. It is most advantageous, however, when applied to cyclization catalysts prepared with carrier materials comprising substantial quantities of gamma alumina.

In the preparation of supported cyclization catalysts the carrier material is preferably first impregnated with the active cyclizing metal compound and then with the promoters. In such cases where in the preparation of the base catalyst a carrier material is impregnated with a metal compound which is later transformed into the active cyclizing agent (for instance, where a carrier is impregnated with chromium nitrate or chromic acid and this is later converted to an oxide), the promoters are preferably incorporated prior to converting the impregnated metal compound to the active cyclizing compound. The promoters of the two above-described classes may, if desired, be incorporated into the catalyst in one step, that is, by a single impregnation. The promoters may, however, also be impregnated separately.

In copending application, Serial No. 380,893, filed February 27, 1941 there is disclosed a process for the cyclization of open chain hydrocarbons using specific catalysts promoted for cyclization with small concentrations of platinum and/or palladium. The promoting action in this case is primarily effective in increasing the conversions in the initial stages of the process cycle and the rate of catalyst decline is normal or slightly faster than normal. The method is therefore particularly adapted for short cycle operation. According to the process of the present invention, promoted catalysts of an entirely different type are employed. The catalysts employed in the present process are specifically promoted for cyclization in such a manner that mid-cycle and average conversions are greatly increased, and the rate of catalyst decline is considerably decreased. The platinum and/or palladium promoters in cyclization catalysts are particularly pronounced and advantageous when the catalyst comprises a support consisting of or comprising substantial amounts of alumina alpha monohydrate. Thus, said promoters are particularly effective when employing catalysts prepared by impregnating the "Activated Alumina" of commerce with cyclizing metal compounds. The promoter substances employed in the catalysts in the process of the present invention differ considerably from the aforesaid platinum and palladium promoter also in this respect in that they are most efficiently employed with catalysts prepared with carrier substances containing the alumina predominantly in the gamma form.

Various aspects of the process of the invention are illustrated by the following examples, which for the sake of clarity have been chosen to be as nearly comparable as possible. Thus, in these examples, except as otherwise specified, the same material is treated under identical conditions and the examples are directly comparable with the above Example I.

Example II

A chrome-alumina catalyst containing 8.4% chromium was prepared by impregnating an adsorptive alumina consisting essentially of gamma alumina with chromic acid. A similar catalyst containing 9.7% chromium was prepared and promoted by the incorporation of 0.5% cerium and 1% potassium. These catalyst when employed for the cyclization of normal heptane under the described conditions gave the following results:

| Time, hours | Conversions | |
| --- | --- | --- |
| | Unpromoted catalyst | Promoted catalyst |
| Initial conversion | 68 | 73 |
| Maximum conversion | 68 | 77 |
| 5 hr. average conversion | 57.0 | 75.8 |
| 7½-hr. average conversion | 51.8 | 75.0 |
| 10 hr. average conversion | 46.7 | 72.4 |
| 25 hr. average conversion | 31.4 | 53.4 |

It is seen that the cerium-potassium promoter greatly promotes the cyclization activity of the catalyst, especially for medium and long cycle operation. It is to be noted that the promoted catalyst contained slightly more chromium oxide. Other experiments have conclusively shown, however, that this difference in chromium concentration cannot account for more than a small fraction of the noted improvement.

Example III

A series of promoted chrome-alumina catalysts containing 11.1% chromium was prepared by impregnating an adsorptive gamma alumina with chromic acid and promoting with cerium and potassium. These catalysts when used for the cyclization of normal heptane under the described conditions gave the following results:

| | Conversions | | | |
| --- | --- | --- | --- | --- |
| Per cent cerium in catalyst | 0.57 | 0.80 | 0.68 | 0 |
| Per cent potassium in catalyst | 1.14 | 1.14 | 1.14 | 0 |
| 5 hr. average conversion | 78.9 | 78.8 | 75.3 | 62.0 |
| 7½ hr. average conversion | 77.2 | 78.8 | 75.6 | 56.6 |
| 10 hr. average conversion | 74.5 | 76.3 | 73.9 | 52.1 |
| 25 hr. average conversion | 54.5 | 54.9 | 54.6 | |

The results obtained with the unpromoted catalyst (Example I) are shown in the last column for comparison. It is seen that the conversions to toluol using the promoted catalysts are greatly increased for both long and short cycle operation. It is also seen by comparison with examples below that the concentration of cerium in the cerium-potassium promoter combination is considerably less critical when promoting a catalyst prepared with a gamma alumina. A commercial mixture of rare earth hydrates consisting essentially of lanthanum, cerium, praseodymium and nedymium with minor proportions of other rare earth hydrates, when substituted for the cerium, gives essentially the same results.

Example IV

An activated alumina consisting largely of alumina alpha monohydrate was impregnated with chromic acid to a chromium content of 10.5%. This material was then impregnated with 0.5% cerium as cerium nitrate. Portions of this material were then impregnated with various proportions of potassium nitrate. After heating and reducing in the usual manner, these catalysts were used for the cyclization of normal heptane. The average conversions obtained over various periods of time and the percentage of potassium in the catalyst are shown in the following table:

| | Conversions | | | | |
| --- | --- | --- | --- | --- | --- |
| Per cent potassium in catalyst | 0.00 | 0.50 | 1.0 | 3.0 | 5.0 |
| Time, hours: | | | | | |
| Initial conversion | 52 | 0 | 58 | 3 | 15 |
| Maximum conversion | 52 | 39 | 81 | 50 | 15 |
| 5 hr. average conversion | 47.7 | 28.6 | 75.1 | 28.5 | 7.8 |
| 7½ hr. average conversion | 46.2 | 24.4 | 73.0 | 35.0 | 6.5 |
| 10 hr. average conversion | 44.0 | 19.9 | 70.2 | 38.6 | 5.5 |
| 25 hr. average conversion | 34.0 | 13.2 | 59.3 | 37.3 | 4.1 |

This example illustrates the remarkable promoting effect of the cerium-potassium combination for cyclization when applied as a typical cyclizing catalyst. Thus, comparing the results with the unpromoted catalyst with those obtained with the promoted catalyst containing 0.5% cerium and 1.0% potassium, it is seen that the conversions over all periods of time are nearly doubled. This example also illustrates the critical nature of the concentrations of potassium in this combination. Thus, it is seen that if the concentration of potassium is reduced to 0.5%, it acts not as a promoter but as a depressant. Also, the detrimental effect of excess potassium in the combination is clearly illustrated.

Example V

A cyclization catalyst similar to that described in Example IV, i. e., containing 10.5% chromium supported upon alumina alpha monohydrate, was impregnated with potassium nitrate to give a concentration of potassium of 1%. Portions of this material were then impregnated with various concentrations of cerium nitrate. After heating and reducing in the usual manner, these catalysts were used for the cyclization of normal heptane. The results obtained are shown in the following table:

| | Conversions | | | |
| --- | --- | --- | --- | --- |
| Percent cerium in catalyst | 0.3 | 0.5 | 0.6 | 1.0 |
| Time, hours: | | | | |
| Initial conversion | 35 | 58 | 38 | 17 |
| Maximum conversion | 57 | 81 | 63 | 31 |
| 5 hr. average conversion | 51 | 75.1 | 52.8 | 26.6 |
| 7½ hr. average conversion | 53 | 73.0 | 54.6 | 27.1 |
| 10 hr. average conversion | 53 | 70.2 | 56.0 | 25.9 |
| 25 hr. average conversion | 46 | 59.3 | 53.0 | 18.3 |

This example clearly illustrates the interdependency of the cerium and potassium promoters in this combination and the critical nature of the cerium concentration. It is seen that with these catalysts containing substantial amounts of alumina alpha monohydrate and 1% potassium, the concentrations of cerium required to give the desired promoter effect is about 0.5%. Cerium concentrations below and above the optimum (for instance, 0.3% and 1% with this particular catalyst) are seen to exert a depressant action.

The interdependence of the rare earth and alkali metal in the combination promoter is also clearly evident upon comparing this example with the following Example VI:

Example VI

Quantities of the same base catalyst as used in Example V were impregnated with 0.3% cerium and then with 0.5%, 1% and 2% potassium. These catalysts when used for the cyclization of normal heptane under the same conditions gave the following results:

|  | Conversions | | |
|---|---|---|---|
| Per cent potassium in catalyst | 0.5 | 1.0 | 2.0 |
| Time, hours: | | | |
| Initial conversion | 42 | 35 | 6 |
| Maximum conversion | 53 | 57 | 11 |
| 5 hr. average conversion | 50.4 | 51 | 7.4 |
| 7½ hr. average conversion | 50.3 | 53 | 8.1 |
| 10 hr. average conversion | 49.5 | 53 | 8.4 |
| 25 hr. average conversion | 41.4 | 46 | 9.1 |

It is seen that whereas the combination of 0.3% cerium and 2% potassium exerts a repressing effect, the combination of 0.3% cerium and 0.5% potassium has an advantageous effect.

Example VII

A base catalyst prepared by impregnating an absorptive alumina consisting predominantly of alumina alpha monohydrate with chromic acid to a chromium concentration of 13.7% was promoted by the combination of potassium and cerium in the concentrations of 1.0 and 0.5% respectively. Portions of this catalyst were then impregnated with various concentrations of sodium nitrate. The results obtained when using these catalysts in the cyclization of normal heptane are shown in the following table:

|  | Conversions | | | |
|---|---|---|---|---|
| Per cent sodium in catalyst | 0.0 | 0.5 | 1.0 | 1.5 |
| Time, hours: | | | | |
| Initial conversion | 15 | 5 | 41 | 19 |
| Maximum conversion | 48 | 66 | 66 | 51 |
| 5 hr. average conversion | 36.9 | 43.0 | 55.8 | 34.6 |
| 7½ hr. average conversion | 40.5 | 50.5 | 59.2 | 39.0 |
| 10 hr. average conversion | 42.4 | 54.0 | 60.7 | 42.1 |
| 25 hr. average conversion | 41.5 | 53.2 | 56.3 | 42.2 |

It is seen from these experiments that sodium when used in conjunction with the potassium-cerium combination exerts an added promoting effect when used in moderate concentrations. Larger concentrations exert a decided depressing effect.

Example VIII

Two portions of a base chrome-alumina catalyst containing 11.3% chromium and prepared with a gamma alumina were impregnated with 0.7% cerium and potassium. In one case the potassium was impregnated in the form of KOH and contained 1.14% potassium and in the other case the potassium was impregnated in the form of $KNO_3$ and contained 1.18% potassium. These catalysts when used for the cyclization of normal heptane under the described conditions gave the following results:

| Promoted with— | KOH | $KNO_3$ |
|---|---|---|
| 5 hr. average conversion | 68.7 | 78.3 |
| 7½ hr. average conversion | 68.6 | 76.7 |
| 10 hr. average conversion | 66.5 | 72.6 |
| 25 hr. average conversion | 49.6 | 50.9 |

These experiments illustrate the somewhat superior effect of the potassium when impregnated in the form of the nitrate. Similar experiments have shown that the nitrate is likewise superior to most other salts such as the chromate, bichomate, etc.

By "cyclization catatlyst" in the following claims is meant a catalyst, such, for example, as those comprising a metal of the left-hand columns of groups IV, V and VI of the periodic table and transition series metals, especially heavy metals of the first transition series, etc., which are effective in catalyzing the conversion of open chain hydrocarbons to ring compounds.

We claim as our invention:

1. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst promoted with from about 2.5% to 20% of a rare earth having an atomic number between 57 and 72 and from about 6% to 30% of an element selected from the group consisting of sodium plus potassium, potassium, rubidium and caesium, said percentages being based upon the amount of metal in the active cyclization component of the catalyst.

2. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst comprising a cyclizing compound of a metal of the first transition series promoted with from about 2.5% to 20% of a rare earth having an atomic number between 57 and 72 and from about 6% to 30% of an element selected from the group consisting of sodium plus potassium, potassium, rubidium and caesium, said percentages being based upon the amount of metal in the active cyclization component of the catalyst.

3. A process for the production of aromatic hydrocarbons from open chain hydrocarbons by catalytic cyclization-dehydrogenation, which comprises contacting on open chain hydrocarbon containing from six to twelve carbon atoms under cyclization conditions with a catalyst comprising a cyclizing metal oxide promoted with from about 2.5% to 20% of a rare earth having an atomic number between 57 and 72 and from about 6% to 30% of an element selected from the group consisting of sodium plus potassium, potassium, rubidium and caesium, said percentages being based upon the amount of metal in the active cyclization component of the catalyst.

4. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst comprising a cyclizing compound of chromium promoted with from about 2.5% to 20% of a rare earth having an atomic number between 57 and 72 and from about 6% to 30% of an element selected from the group consisting of sodium plus potassium, potassium, rubidium and caesium, said percentages being based upon the amount of metal in the active cyclization component of the catalyst.

5. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst comprising chromium oxide promoted with from about 2.5% to 20% of a rare earth having an atomic number between 59 and 42 and from about 6% to 30% of an element selected from the group consisting of sodium plus potassium, potassium, rubidium and caesium, said percentages being based upon the amount of metal in the active cyclization component of the catalyst.

6. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst comprising a cyclizing metal compound supported upon a relatively inert carrier and promoted with from about 2.5% to 20% of a rare earth having an atomic number between 57 and 72 and from about 6% to 30% of an element selected from the group consisting of sodium plus potassium, potassium, rubidium and caesium, said percentages being based upon the amount of metal in the active cyclization component of the catalyst.

7. Process according to claim 6 in which the relatively inert carrier is an alumina.

8. Process according to claim 6 in which the relatively inert carrier consists predominantly of gamma alumina.

9. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst promoted with from about 2.5% to 20% of a rare earth having an atomic number between 57 and 72 and from about 6% to 30% of potassium, said percentages being based upon the amount of metal in the active cyclization component of the catalyst.

10. Process according to claim 9 in which the potassium component of the promoter combination is introduced into the catalyst in the form of potassium nitrate.

11. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst promoted with from about 2.5% to 20% of a mixture of rare earths having an atomic number between 57 and 72 containing cerium and from about 6% to 30% of an element selected from the group consisting of sodium plus potassium, potassium, rubidium and caesium, said percentages being based upon the amount of metal in the active cyclization component of the catalyst.

12. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst comprising a cyclizing compound of a metal of the first transition series supported upon a major proportion of relatively inert carrier and promoted with from about 2.5% to 20% of a rare earth having an atomic number between 57 and 72 and from about 6% to 30% of an element selected from the group consisting of sodium plus potassium, potassium, rubidium and caesium, said percentages being based upon the amount of metal in the active cyclization component of the catalyst.

13. A process for the production of aromatic hydrocarbons from open chain hydrocarbons by catalytic cyclization-dehydrogenation, which comprises contacting an open chain hydrocarbon containing from six to twelve carbon atoms under cyclization conditions with a catalyst comprising a cyclizing metal oxide supported upon a major proportion of an alumina carrier and promoted with from 2.5% to 20% of a rare earth having an atomic number between 57 and 72 and from about 6% to 30% of an element selected from the group consisting of sodium plus potassium, potassium, rubidium, and caesium, said percentages being based upon the amount of metal in the active cyclization component of the catalyst.

14. A process for the production of aromatic hydrocarbons from open chain hydrocarbons by catalytic cyclization-dehydrogenation, which comprises contacting an open chain hydrocarbon containing from six to twelve carbon atoms under cyclization conditions with a cyclization catalyst comprising chromium oxide supported upon a major proportion of an alumina carrier consisting predominantly of gamma alumina and promoted with from about 2.5% to 20% of a rare earth having an atomic number between 57 and 72 and from about 6% to 30% of an element selected from the group consisting of sodium plus potassium, potassium, rubidium and caesium, said percentages being based upon the amount of metal in the active cyclization component of the catalyst.

BERNARD S. GREENSFELDER.
RAYMOND C. ARCHIBALD.